United States Patent [19]
Medsker et al.

[11] Patent Number: 5,952,425
[45] Date of Patent: Sep. 14, 1999

[54] PREFERRED STRUCTURE OF PHENOLIC RESIN CURATIVE FOR THERMOPLASTIC VULCANIZATE

[75] Inventors: Robert E. Medsker, Hartville; Gary W. Gilbertson, Barberton; Raman Patel, Akron, all of Ohio

[73] Assignee: Advanced Elastomer Systems, L.P., Akron, Ohio

[21] Appl. No.: 08/971,508

[22] Filed: Nov. 17, 1997

Related U.S. Application Data

[63] Continuation-in-part of application No. 08/775,853, Dec. 31, 1996, abandoned.

[51] Int. Cl.⁶ .............................. C08L 23/16; C08L 23/12; C08L 61/10
[52] U.S. Cl. ........................ 525/133; 525/139; 528/165
[58] Field of Search ...................................... 525/133, 139, 525/165; 528/165

[56] References Cited

U.S. PATENT DOCUMENTS

| | | |
|---|---|---|
| 4,036,816 | 7/1977 | Vasisth et al. . |
| 4,120,847 | 10/1978 | Culbertson . |
| 4,130,534 | 12/1978 | Coran et al. . |
| 4,311,628 | 1/1982 | Abdou-Sabet et al. . |
| 5,073,597 | 12/1991 | Puydak et al. . |
| 5,457,159 | 10/1995 | Fassina ..................................... 525/133 |

OTHER PUBLICATIONS

Van Duin et al, "The Chemistry of Phenol–Formaldehyde Resin Vulcanization of EPDM: Part I. Evidence For Methylene Crosslinks", Rubber Chemistry and Technology, vol. 68, No. 5, Nov. 1995, pp. 717–727.

Application of a Cone/Plate Rheometer for the Characterization of Resol–Type Phenol Formaldehyde Resins, Journal of Applied Polymer Science; Applied Polymer Symposium 51, 277–291 (1992), published Sep. 1, 1992, by John Wiley and presented to the public May 2 through May 8, 1991.

*Primary Examiner*—David Buttner
*Attorney, Agent, or Firm*—Samuel B. Laferty; William A. Skinner

[57] ABSTRACT

Phenolic resin curatives having a majority of dibenzyl ether linkages were unexpectedly found to be very effective in curing unsaturated rubbers in a blend of a crystalline polyolefin and said rubber. Their effectiveness exceeds that of conventional phenolic resins for many thermoplastic vulcanizate compositions allowing for the reformulation of the recipes with lower amounts of curatives and equivalent or superior physical properties in the resulting thermoplastic vulcanizate.

25 Claims, 2 Drawing Sheets

PREFERRED STRUCTURE OF PHENOLIC RESIN CURATIVE FOR THERMOPLASTIC VULCANIZATE

CROSS REFERENCE

This application is a Continuation-In-Part of U.S. application Ser. No. 08/775,853, filed Dec. 31, 1996 for "Preferred Structure of Phenolic Resin Curative for Thermoplastic Vulcanizate" now abandoned.

FIELD OF INVENTION

The invention relates to thermoplastic vulcanizates from a crystalline polyolefin and an unsaturated rubber such as EPDM, butyl rubber, natural rubber, synthetic rubber made from a conjugated diene, or synthetic rubber made from a conjugated diene along with another olefin monomer, or combinations thereof, and which are cured with phenolic resin curatives. They are useful as rubbery articles formed with conventional thermoplastic forming equipment.

BACKGROUND OF THE INVENTION

Phenolic resin curatives for EPDM, butyl rubber, natural rubber, and synthetic rubber from conjugated diene monomers or combinations thereof are known. The use of phenolic curatives in combinations with EPDM, butyl rubber, natural rubber, and synthetic rubber from conjugated diene monomers in thermoplastic elastomers is also known.

The structure of phenolic resins used in the curing of elastomers varies depending on the reaction conditions used to prepare them. Resole resins hare 2 types of structures between aromatic rings, dibenzyl ether and/or methylene links. Dibenzyl ether links are preferably formed under basic conditions and lower reaction temperatures. Methylene bridge links are preferably formed under acidic conditions and higher reaction temperatures. Both structures, however, are typically formed in resole resin synthesis. According to textbooks such as George Odian's "Principles of Polymerizations" 2nd ed. @ pp. 128–133, the relative importance of the phenolic resin (resole resin) structure has not been well established. However, publications such as Applications of a Cone/Plate Rheometer for the Characterization of Resol-Type Phenol Formaldehyde Resins by Solomon So et al., Journal of Polymer Science, Applied Polymer Symposium 51, 227–291(1992) pages 287–289 teach that resol-type phenol formaldehyde resins having a higher level of methylene bridges possess shorter cure times.

Resole resins having high or exclusively methylene linkages are preferred for elastomer vulcanization in the thermoset rubber industry.

SUMMARY OF INVENTION

Thermoplastic elastomeric compositions from a crystalline polyolefin and an unsaturated rubber can be more effectively cured with a phenolic resin curative having from about 50 to about 99 dibenzyl ether linkages per 100 aromatic rings. Unexpectedly these phenolic resin curatives are more active than conventional phenolic curatives. Dynamic vulcanization may require about 30 to about 80 weight percent less of these curatives than with conventional high methylene bridge content phenolic resin to impart an equivalent degree of crosslinking. The phenolic resin curatives with a high percentage of dibenzyl ether (ether) bridges also retain more of their activity as a curative after storage or processing at elevated temperatures than do conventional phenolic resin curatives.

DETAILED DESCRIPTION

Figure 1:
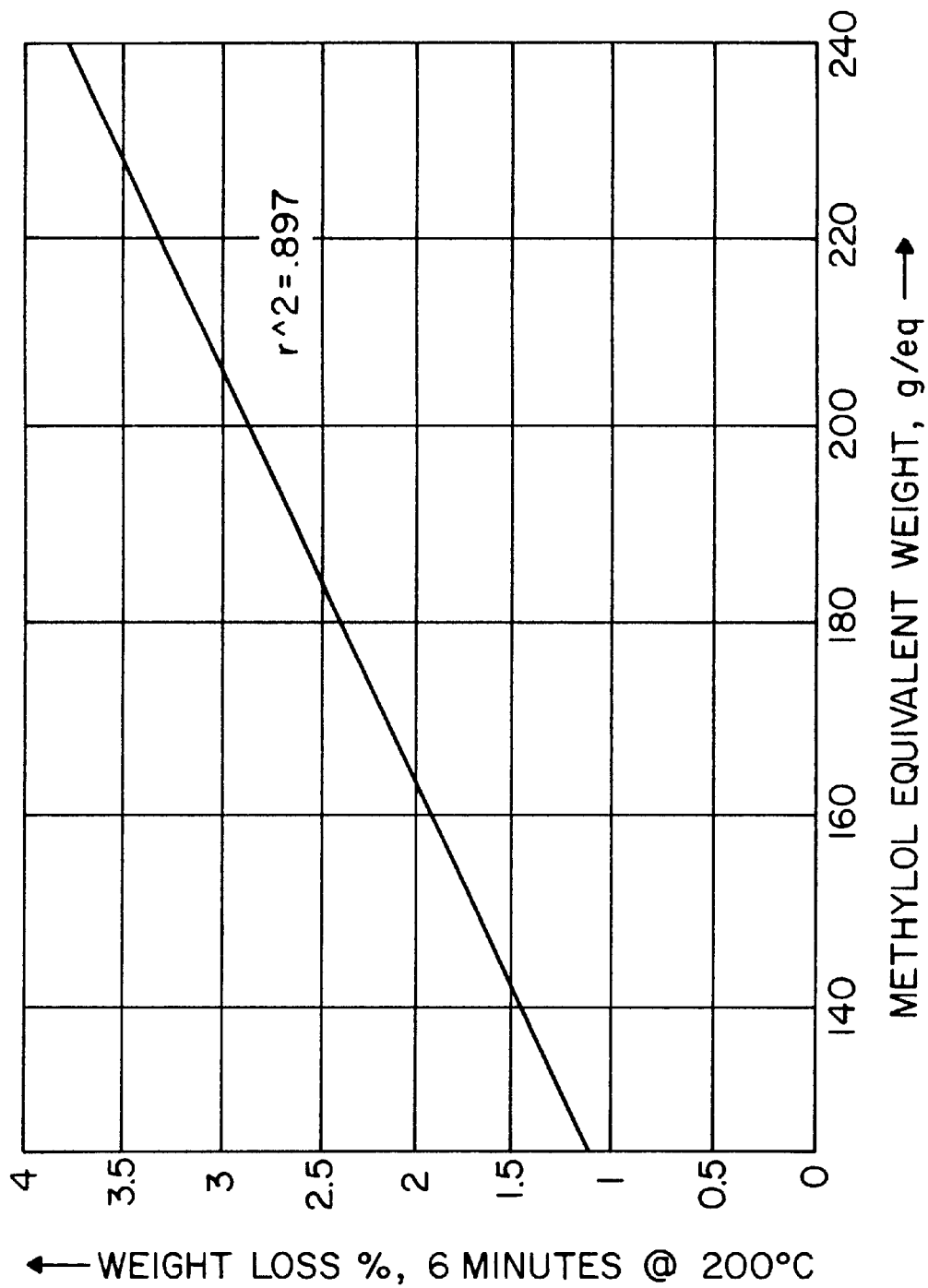
FIG. 1 illustrates the weight loss (0–4 wt. %) of resole type phenol formaldehyde resins measured after aging at 200° C. for 6 minutes in a circulating air oven as a function of methylol equivalent weight (120–240 g/eq).

Phenol formaldehyde resole resins are characterized by formulas such as shown below.

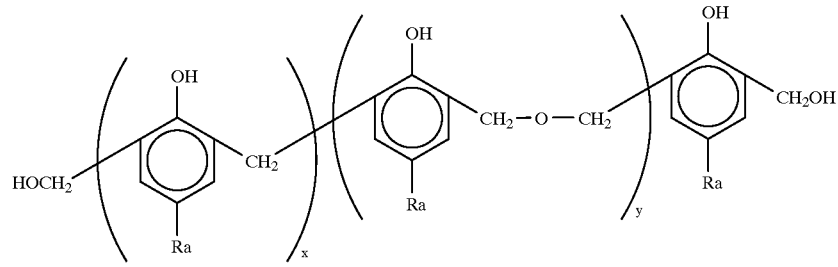

where x is the number of aromatic rings with a subsequent methylene bridge and y is the number of aromatic rings with a subsequent dibenzyl ether (ether) bridge ($CH_2$—O—$CH_2$). The phenolic resin curatives need not be linear (e.g. they can be branched) and the methylene bridges and ether bridges are randomly present in the structure such that sequences of 1, 2, 3 etc. methylene and/or ether bridges are randomly present. In phenolic resin curatives the sum of x+y can generally vary from about 1 to about 15 or more. In conventional phenolic resin curatives for thermoset elastomers the values of x and y are such that there are on average less than 10 dibenzyl ether bridges per 100 aromatic rings. In conventional phenolic resin curatives for dynamic vulcanizates the values of x and y are such that there are about 20 to about 46 dibenzyl ether bridges per 100 aromatic rings. In the phenolic resin of this invention the average values of x and y vary so that there are from about 50 to 99 dibenzyl ether bridges per 100 aromatic rings, more desirably from about 60 to about 99, and preferably due to the number of bridges being slightly less than the number of aromatic rings from about 60 to about 90 or 93 dibenzyl ether bridges per 100 aromatic rings. An alternate preferred range of dibenzyl ether bridges is from about 50 or 55 to about 80 or 85, more preferably from about 55, 60, or 65 to about 75, 80, or 85. Ra in the above formula independently on each aromatic ring is a H atom or an alkyl of 1 to 12 carbon atoms. Thus the phenolic resins can be alkyl substituted phenolic resins. It is also understood that some methylene bridges may be present in the preferred phenolic resin but the number of methylene bridges will be less than the number of dibenzyl ether bridges per 100 aromatic rings. The level of dibenzyl ether bridges may also be expressed in terms of the methylol equivalent weight. Since each dibenzyl ether bridge is viewed as two methylol groups, increasing the number of dibenzyl ether bridges (reducing the number of methylene bridges) increases the equivalents of methylol in a phenolic resin. The methylol equivalent weight is the number average molecular weight of the phenolic resin, divided by the average sum of methylol groups per molecule plus twice the number of dibenzyl ether groups per molecule. Conventional phenolic resins for curing thermoset rubbers have methylol equivalent weights from about 400 to 1700 or more. Desirable methylol equivalent weight for thermoplastic vulcanizates in the present invention is from about 100 to about 200, more desirably from about 125 to about 165, 175 or 185 and preferably from about 125 or 135 to about 165 or 175. The methylol equivalent weights previously recited would vary lower for t-butyl and higher for t-dodecyl groups on the phenol. Those phenolic resins desirably have t-butyl, t-octyl or t-dodecyl substituents thereon. Desirably, a majority of the phenolic repeat units (e.g. greater than 50, 60, 70 or 80 mole %) have one of these substituents. One can anticipate based on the chemical structure shown in the detailed description that a desirable optimization of dibenzyl ether bridges would result in the equivalent of 2 methylols per phenol repeat unit when each dibenzyl ether bridge is calculated as equivalent to 2 methylol groups. This would yield estimated minimum methylol equivalent weight of ½ the molecular weight of an average phenolic repeat unit. Desirably the methylol equivalent weight is from about 0.5 to about 0.8 times the average molecular weight of a phenolic repeat unit, more desirably from about 0.55, 0.60, or 0.65 to about 0.72, 0.75 or 0.80 times the average molecular weight of a phenolic repeat unit in the particular phenolic resin curative.

Methylol equivalent weight ranges can be calculated which are equivalent to ranges for the dibenzyl ether bridges per 100 aromatic rings. For a t-butyl substituted phenolic resin having an average molecular weight per phenolic repeat unit of about 192) an estimated range of desirable methylol equivalent weights would be from 100, 110 or 120 to about 130, 140 or 150. For a t-octyl substituted phenolic resin (having an average molecular weight per phenolic repeat unit of about 249) an estimated desirable range of methylol equivalent weight is about 125 or 135 or 145 to about 180, 190 or 200. For a t-dodecyl substituted phenolic resin (molecular weight per phenolic repeat unit about 306) an estimated desirable range of methylol equivalent weights would be from about 150, 165 or 175 to about 215, 225, 235 or 245. The resole type phenol formaldehyde resin with para-t-octyl substituents is preferred.

The preferred phenolic resin curatives of this disclosure can be made by altering the procedure wherein phenol formaldehyde reactants are formed. The phenolic resins with a higher number of dibenzyl ether bridges (linkages) are believed during acid catalyzed curing to break apart to provide more fragments that are active in crosslinking unsaturated rubber. It is also believed that the phenolic resins with a high number of dibenzyl ether bridges were not used in traditional rubber vulcanizates because volatiles may be released in higher amounts from their breakdown and these volatiles could generate undesirable voids in a traditional rubber vulcanizate.

The preparation of phenolic resins with different ratios of methylene and dibenzyl ether bridges is well known to the art. The following references give additional information for preparing phenolic resins: G. Odian Chapter 2–12b4, "Principles of Polymerization", 2nd Edition, Wiley Intersciene, New York, 1981; I. H. Updegraff and T. J. Suen, "Condensations with Formaldehyde; Chapter 14 in "Polymerization Processes", C. E. Schildkneckt and I. Skeist, Wiley-Interscience, New York, 1977; M. F. Drumm and J. R. LeBlanc, "The Reactions of Formaldehyde with Phenols, Melamine, Analine, and Urea", Chapter 5 in "Step-Growth Polymerizations", D. H. Solomon, Ed., Marcel Dekker, New York, 1972; and R. W. Lenz, "Organic Chemistry of Synthetic High Polymers", Chaps. 4–8, Wiley-Interscience New York, 1967. The number of methylene or dibenzyl ether bridges can be determined according to the procedure in the "Journal of Polymer Science", Part A, Volume 3, pp. 1079–1106 (1965) entitled "Acetylation and H-NMR Procedure for Phenolic Resin Structure Analysis".

The use of conventional phenolic resin curatives for crosslinking EPDM in a thermoplastic elastomer is disclosed in U.S. Pat. No. 4,311,628 hereby incorporated by reference for its teachings thereon. Those types of phenolic resin curatives, modified solely to have more dibenzyl ether linkages, could be used in this invention. Phenolic curative systems comprising methylol phenolic resins, a halogen donor and a metal compound are especially recommended. Halogenated phenol curatives containing 2–10 weight percent halogen, with bromine being a preferred halogen, do not require halogen donors. The ordinary non-halogenated phenol curatives are more effective with a halogen donor. When halogens are present on the curative or donor it is desirable to use at least one halogen halide scavenger such as metal oxides including iron oxide, titanium oxide, magnesium oxide, magnesium silicate, and silicon dioxide and preferably zinc oxide. Examples of halogen donors are stannous chloride; ferric chloride; and halogen donating polymers such as chlorinated paraffin, chlorinated polyethylene, chlorosulfonated polyethylene and polychlorobutadiene (neoprene rubber).

Typically the phenolic resin curative (also known as phenol resin curative) with higher dibenzyl ether linkage content is used in amounts from about 0.5 to about 20 parts by weight per 100 parts by weight of unsaturated rubber. More desirably the amount of phenolic curative is from about 0.5 to about 14 parts by weight per 100 parts by weight of the unsaturated rubber. Appropriate amounts of cure activators such as halogen donors are desirably from about 0.01 part by weight to about 10 parts by weight or more per 100 parts of the unsaturated rubber. It has been found that the phenolic resin curative, activators, and halogen scavengers do not result in significant amounts of grafts of the rubber to the crystalline polyolefin.

The major portion of polymers in the thermoplastic elastomer are the crystalline polyolefin and an unsaturated rubber. Examples of crystalline polyolefin are polyethylene or polypropylene or their copolymers and mixtures thereof. The unsaturated rubber may be a polyolefin such as EPDM rubber that because of the randomness of its repeat structure or side groups tends not to crystallize or in the case of EPDM they are not predominantly ethylene or propylene moieties which tend to crystallize. Examples of the unsaturated rubber include EPDM rubber, butyl rubber, natural rubber, or synthetic rubbers from at least one unsaturated diene monomer, or combinations thereof. Minor amounts of other polymers may be added to modify flow properties, as fillers or diluents, or as additives, such as polymeric antioxidants. Amounts of most of the components to the blend will be specified either 1) per 100 parts by weight of the blend of the crystalline polyolefin and the unsaturated rubber or 2) per 100 parts by weight of unsaturated rubber.

The crystalline polyolefin is desirably from about 15 to about 75 parts by weight, more desirably from about 25 to about 75 parts by weight, and preferably from about 25 to about 50 parts by weight per 100 parts of the blend of crystalline polyolefin and the unsaturated rubber. The unsaturated rubber is desirably from about: 25 to about 85 parts by weight, more desirably from about 25 to about 75 parts by weight and preferably from about 50 to about 75 parts by weight per 100 parts by weight of said blend. If the amount of crystalline polyolefin is based on the amount of unsaturated rubber it is desirably from about 17.5 to about 300 parts by weight, more desirably from about 33 to about 300 parts and preferably from about 33 to about 200 parts by weight per 100 parts by weight of the unsaturated rubber.

The terms "blend", "thermoplastic elastomer", and "thermoplastic vulcanizate" used herein mean a mixture ranging from small particles of crosslinked rubber well dispersed in the thermoplastic elastomer matrix to co-continuous phases of the crystalline polyolefin and a partially to fully crosslinked rubber or combinations thereof. While thermoplastic elastomer can include block copolymers that need not be vulcanized, the term thermoplastic vulcanizate is limited to where the rubber phase is at least partially vulcanized (crosslinked).

The term "thermoplastic vulcanizate" refers to compositions that may possess the properties of a thermoset elastomer and are reprocessable in an internal mixer. Upon reaching temperatures above the softening point or melting point of the crystalline polyolefin phase they can form continuous sheets and/or molded articles with complete knitting or fusion of the thermoplastic vulcanizate under conventional molding or shaping conditions for thermoplastics.

Subsequent to dynamic vulcanization (curing) of the rubber phase of the thermoplastic elastomer or vulcanizate, desirably less than 3 wt. % and more desirably less than 1 wt. % of the unsaturated rubber is extractable from the specimen of the thermoplastic elastomer in boiling xylene. Techniques for determining extractable rubber as set forth in U.S. Pat. No. 4,311,628 are herein incorporated by reference.

The crystalline polyolefin comprises crystalline thermoplastic polymers from the polymerization of monoolefin monomers by a high pressure, low pressure or intermediate pressure process; or by Ziegler Natta catalysts or by metallocene catalysts. Desirably the monoolefin monomers converted to repeat units are at least 95 wt. % monoolefins of the formula $CH_2=C(CH_3)-R$ or $CH_2=CHR$ where R is an H or a linear or branched alkyl group of from 1 to 12 carbon atoms. Preferred crystalline polyolefins are polyethylene and polypropylene or their copolymers and mixtures thereof. The polyethylene can be high density, low density, linear low density, or very low density. The polypropylene can be a homopolymer as well as a reactor copolymer polypropylene.

The unsaturated rubber can be any rubber having residual unsaturation that can react and be crosslinked with the phenolic resin under conventional crosslinking conditions. These rubbers can include natural rubber, EPDM rubber, butyl rubber, halobutyl rubber, or synthetic rubbers from at least one conjugated diene, or combinations thereof. Also included are rubbers comprising at least one alpha-olefin, at least one vinylidene aromatic compound and at least one diene. EPDM, butyl and halobutyl rubbers are referred to as rubbers low in residual unsaturation and are preferred when the vulcanizate needs good thermal stability or oxidative stability. The rubbers low in residual unsaturation desirably have less than 10 wt. to repeat units having unsaturation. Desirably excluded from unsaturated rubbers are acrylate rubber and epichlorohydrin rubber. For the purpose of this invention copolymers will be used to define polymers from two or more monomers and polymers can have repeat units from 1 or more different monomers.

The rubber low in residual unsaturation is desirably an olefin rubber such as EPDM type rubber. EPDM type rubbers are generally terpolymers derived from the polymerization of at least two monoolefin monomers having from 2 to 10 carbon atoms, preferably 2 to 4 carbon atoms, and at least one poly-unsaturated olefin having from 5 to 20 carbon atoms. Said monoolefins desirably have the formula $CH_2=CH-R$ where R is an H or an alkyl of 1–12 carbon atoms and are preferably ethylene and propylene. Desirably the ethylene and propylene are present in the polymer in weight ratios of 5:95 to 95:5 (ethylene/propylene) and constitute from about 90 to about 99.6 wt. % of the polymer. The polyunsaturated olefin can be a straight chained, branched, cyclic, bridged ring, bicyclic, fused ring bicyclic compound etc. Preferably it is a non-conjugated diene. Desirably repeat units from the non-conjugated polyunsaturated olefin is from about 0.4 to about 10 wt. % of the rubber.

The rubber low in residual unsaturation can be a butyl rubber. Butyl rubber is defined a polymer predominantly comprised of repeat units from isobutylene but including a few repeat units of a monomer which provides sites for crosslinking. The monomers which provide sites for crosslinking can be a polyunsaturated monomer such as a conjugated diene or divinyl benzene. Desirably from about 90 to about 99.5 wt. % of the butyl rubber is repeat units derived from the polymerization of isobutylene and from about 0.5 to about 10 wt. % of the repeat units are from a polyunsaturated monomer having from 4 to 12 carbon atoms. Preferably the polyunsaturated monomer is isoprene or divinylbenzene. The polymer may be halogenated to further enhance reactivity in crosslinking. Preferably the halogen is present in amounts from about 0.1 to about 10 wt. %, more preferably about 0.5 to about 3.0 wt. % and preferably the halogen is chlorine or bromine.

Other rubber such as natural rubber or a synthetic rubber from at least one conjugated diene can be used in the dynamic vulcanizate. These rubbers are higher in unsaturation than EPDM rubber and butyl rubber. The natural rubber and synthetic rubber can optionally be partially hydrogenated to increase thermal and oxidative stability. The synthetic rubber can be nonpolar or polar depending on the comonomers. Desirably the synthetic rubber has repeat units from at least one conjugated diene monomer having from 4 to 8 carbon atoms. Comonomers may be used and include vinyl aromatic monomer(s) having from 8 to 12 carbon atoms and acrylonitrile or alkyl substituted acrylonitrile monomer(s) having from 3 to 8 carbon atoms. Other comonomers desirably used include repeat units from monomers having unsaturated carboxylic acids, unsaturated dicarboxylic acids, unsaturated anhydrides of dicarboxylic acids and other monomers having from 3 to 20 carbon atoms. Examples of synthetic rubbers include synthetic polyisoprene, polybutadiene rubber, styrene-butadiene rubber, butadiene-acrylonitrile rubber etc. Amine functionalized or epoxy functionalized synthetic rubbers may be used. Examples of these include amine functionalized EPDM, and epoxy functionalized natural rubbers. Blends of any of the above elastomers may be employed rather than a single elastomer.

The thermoplastic elastomers of this disclosure are generally prepared by melt mixing the crystalline polyolefin, the unsaturated rubber, and other ingredients (filler, plasticizer lubricant, stabilizer, etc.) in a mixer heated to above the melting temperature of the crystalline polyolefin. The optional fillers, plasticizers, additives etc. can be added at this stage or later. After sufficient molten-state mixing to form a well mixed blend, phenolic resin vulcanizing agents (also known as curatives or crosslinkers) are generally added. It is preferred to add the vulcanizing agent in solution with a liquid, for example rubber processing oil, which is compatible with the other components. It is convenient: to follow the progress of vulcanization by monitoring mixing torque or mixing energy requirements during mixing. The mixing torque or mixing energy curve generally goes through a maximum after which mixing can be continued somewhat longer to improve the fabricability of the blend. If desired, one can add some of the ingredients after the dynamic vulcanization is complete. After discharge from the mixer, the blend containing vulcanized rubber and the thermoplastic can be milled, chopped, extruded, pelletized, injection molded, or processed by any other desirable technique. It is usually desirable to allow the fillers and a portion of any plasticizer to distribute themselves in the rubber or crystalline polyolefin phase before the rubber phase or phases are crosslinked. Crosslinking (vulcanization) of the rubber can occur in a few minutes or less depending on the mix temperature, shear rate, and activators present for the phenolic resin curative. Suitable curing temperatures include from about 120° C. for a crystalline polyethylene or 175° C. for a crystalline polypropylene phase to about 250° C., more preferred temperatures are from about 150 or 170 to about 200 or 225° C. The mixing equipment can include Banbury™ mixers, Brabender™ mixers and certain mixing extruders.

The thermoplastic elastomer can include a variety of additives. The additives include particulate fillers such as carbon black, silica, titanium dioxide, colored pigments, clay, zinc oxide, stearic acid, stabilizers, antidegradants, flame retardants, processing aids, adhesives, tackifiers, plasticizers, wax, discontinuous fibers (such as wood cellulose fibers) and extender oils. When extender oil is used it can be present in amounts from about 5 to about 300 parts by weight per 100 parts by weight of the blend of crystalline polyolefin and unsaturated rubber. The amount of extender oil (e.g. hydrocarbon oils and ester plasticizers) may also be expressed as from about 30 to 250 parts, more desirably from about 70 to 200 parts by weight per 100 parts by weight of said unsaturated rubber. Desirable amounts of carbon black, when present, are from about 40 to about 250 parts by weight per 100 parts by weight of unsaturated rubber from about 10 to about 100 parts by weight per 100 total parts by weight total of said unsaturated rubber and said extender oil.

Thermoplastic elastomer compositions of the invention are useful for making a variety of articles such as tires, hoses, belts, gaskets, moldings and molded parts. They are particularly useful for making articles by extrusion, injection molding and compression molding techniques. They also are useful for modifying thermoplastic resins, in particular, polyolefin resins. The compositions can be blended with thermoplastic resins using conventional mixing equipment making a rubber modified thermoplastic resin. The properties of the modified thermoplastic resin depend upon the amount of thermoplastic elastomer composition blended.

The stress-strain properties of the compositions are determined in accordance with the test procedures set forth in ASTM D412. These properties include tension set (TS), ultimate tensile strength (UTS), 100% modulus (M100), 300% modulus (M300), and ultimate elongation at break (UE). The term "thermoplastic elastomer" or "elastomeric" as used herein and in the claims means a composition which possesses the tension set property of forcibly retracting within a given period of time (1 to 10 minutes) to less than 160% of its original length after being stretched at room temperature to twice its original length and held for the same period of time (1 to 10 minutes) before release. Compression set (CS) is determined in accordance with ASTM D-395, Method B, by compressing the sample for 22 hours at 100° C. Oil swell (OS) (percent change in weight) is determined in accordance with the ASTM D-471 by submerging the specimen in ASTM #3 oil for 70 hours at 123±2° C. Especially preferred compositions of the invention are rubbery compositions having tension set values of about 50% or less which compositions of the invention are rubbery compositions having tension set values of about 50% or less which compositions meet the definition for rubber as defined by ASTM Standards, V. 28, page 756 (D1566). More preferred compositions are rubbery compositions having a Shore D hardness of 60 or below or a 100% modulus of 180 kg/cm² or less or a Young's modulus below 2500 kg/cm².

EXAMPLES

The following examples were prepared to illustrate the effectiveness of the phenolic resin curative with a higher number of dibenzyl ether linkages per 100 aromatic rings in curing the EPDM rubber in thermoplastic elastomers. The mixing procedure is as generally set forth in this specification. In Table I Controls A–D used a conventional phenolic resin curative at a 2 phr concentration based on the EPDM rubber. In Examples 1–6 the phenolic resin curatives had 53 to 71 dibenzyl ether linkages per 100 aromatic rings and were used at 2 phr concentration. Examples 1–6 had higher ultimate tensile strength (UTS), higher 300% modulus (M300), lower compression set (CS), and lower oil swell (OS) than the controls cured with the same amount by weight of conventional phenolic resin curatives. These differences in the physical properties illustrate the preferred phenolic resin curatives give additional crosslinks when the curatives are used in low amounts.

TABLE II

|  | Control E | Control F | Control G | Example 7 | Example 8 |
| --- | --- | --- | --- | --- | --- |
| EPDM Rubber | 100 phw | 100 | 100 | 100 | 100 |
| Polypropylene | 45 | 45 | 45 | 45 | 45 |
| Oil | 135 | 135 | 135 | 135 | 135 |
| Wax | 5 | 5 | 5 | 5 | 5 |

TABLE I

|  | Ctrl A | Ctrl B | Ctrl C | Ctrl D | Ex 1 | Ex 2 | Ex 3 | Ex 4 | Ex 5 | Ex 6 |
| --- | --- | --- | --- | --- | --- | --- | --- | --- | --- | --- |
| EPDM Rubber | 100 pbw | 100 | 100 | 100 | 100 | 100 | 100 | 100 | 100 | 100 |
| Polypropylene | 45 | 45 | 45 | 45 | 45 | 45 | 45 | 45 | 45 | 45 |
| Oil | 135 | 135 | 135 | 135 | 135 | 135 | 135 | 135 | 135 | 135 |
| Wax | 5 | 5 | 5 | 5 | 5 | 5 | 5 | 5 | 5 | 5 |
| Clay | 42 | 42 | 42 | 42 | 42 | 42 | 42 | 42 | 42 | 42 |
| ZnO | 2 | 2 | 2 | 2 | 2 | 2 | 2 | 2 | 2 | 2 |
| Phenolic Resin | 2.0 | 2.0 | 2.0 | 2.0 | 2.0 | 2.0 | 2.0 | 2.0 | 2.0 | 2.0 |
| SnCl2 | 1.26 | 1.26 | 1.26 | 1.26 | 1.26 | 1.26 | 1.26 | 1.26 | 1.26 | 1.26 |
| Characterization of Phenolic Resin | | | | | | | | | | |
| Ether Bridges per 100 aromatic rings | 23 | 35 | 40 | 46 | 53 | 57 | 62 | 68 | 70 | 71 |
| Weight per Methylol Equivalent g/mole | 411.8 | 279.4 | 233.4 | 215.6 | 197.7 | 187.7 | 177.8 | 161.4 | 159.9 | 158.5 |
| Resin Type | SP1045 | SP1045 | SP1045 | SP1045 | SP1045M | SP1045M | SP1045M | SMD9938 | HRJ 12247 | SMD 9938 |
| Properties of Thermoplastic Elastomers | | | | | | | | | | |
| Shore A | 53 | 54 | 62 | 60 | 61 | 58 | 59 | 60 | 60 | 59 |
| TS % | 12 | 12 | 8 | 8 | 8 | 8 | 8 | 8 | 9 | 9 |
| UTS, MPa | 3.10 | 3.66 | 4.21 | 4.34 | 5.52 | 5.24 | 5.10 | 5.86 | 5.79 | 5.66 |
| M100, MPa | 1.59 | 1.86 | 2.07 | 2.14 | 2.48 | 2.28 | 2.21 | 2.62 | 2.34 | 2.28 |
| M300, MPa | 2.90 | 3.66 | 4.07 | 4.07 | 5.17 | 4.76 | 4.76 | 5.59 | 5.17 | 5.10 |
| UE % | 370 | 330 | 330 | 330 | 330 | 360 | 330 | 320 | 340 | 340 |
| CS, % (100° C., 22 hr) | 48.0 | 31.7 | 31.9 | 33.6 | 23.4 | 29.2 | 24.3 | 24.2 | 23.0 | 22.2 |
| OS, % (123 ± 2° C., 70 hr) | 189.9 | 168.5 | 130.1 | 135.2 | 100.9 | 115.2 | 100.0 | 98.5 | 87.0 | 91.0 |

*pbw — all recipe based on one hundred parts by weight of rubber.

In Table II the thermoplastic elastomers were prepared with a nearly identical recipe to Table I but the amount of phenol resin curative was increased to 4.5 phr. The Examples 7 and 8 in Table II have lower oil swell than the Controls E, F and G. This change in oil swell illustrates that Examples 7 and 8 cured with the phenolic resins having higher number of ether linkages are more resistant to swelling in oil, presumably due to more crosslinks. The remainder of the physical properties of Controls E, and F were similar to Examples 7 and 8. This illustrates that with higher amounts of conventional phenolic resin some properties equivalent to those achieved with phenolic resins having a higher number of dibenzyl ether linkages can be obtained. Control G with very low ether bridge (linkage) content gave lower crosslink density as evidenced by its lower Shore A hardness, lower ultimate tensile strength, and higher compression set and higher oil swell. The physical properties of Examples 5 and 6 of Table I using 2 phr of the phenolic resin with a higher number of ether linkages can be compared to the physical properties of Controls E, F, and G of Table II cured with a 4.5 phr of a conventional phenolic resin curative to illustrate that 2 phr of the phenolic resins with higher number of dibenzyl ether linkages produces thermoplastic elastomers with comparable properties to the same formulations cured with 4.5 phr of conventional phenolic resin curatives.

TABLE II-continued

|  | Control E | Control F | Control G | Example 7 | Example 8 |
| --- | --- | --- | --- | --- | --- |
| Clay | 42 | 42 | 42 | 42 | 42 |
| ZnO | 2 | 2 | 2 | 2 | 2 |
| Phenolic Resin | 4.5 | 4.5 | 4.5 | 4.5 | 4.5 |
| SnCl$_2$ | 1.26 | 1.26 | 1.26 | 1.26 | 1.26 |
| Characterization of Phenolic Resin | | | | | |
| Ether Bridges per 100 aromatic rings | 40 | 46 | 23 | 70 | 71 |
| Equivalent Weight per Methylol | 233.4 | 215.6 | 411.8 | 159.9 | 158.5 |
| Resin Type | SP1045 | SP1045 | SP1045 | HRJ 12247 | SMD 9938 |
| Properties of Thermoplastic Elastomer | | | | | |
| Shore A | 63 | 64 | 58 | 63 | 64 |
| TS % | 6 | 6 | 7.5 | 6 | 8 |
| UTS, MPa | 6.48 | 6.41 | 4.55 | 6.07 | 6.28 |
| M100, MPa | 2.69 | 2.69 | 2.28 | 2.62 | 2.83 |
| M300, MPa | 6.00 | 6.07 | — | 5.17 | — |
| UE % | 330 | 310 | 290 | 300 | 290 |
| CS, % (100° C., | 19.4 | 21.8 | 30 | 22.0 | 16.2 |

TABLE II-continued

|  | Control E | Control F | Control G | Example 7 | Example 8 |
|---|---|---|---|---|---|
| OS, % (123 ± 2° C., 70 hr) | 83.2 | 82.0 | 108 | 68.0 | 64.7 |

The compositions in Table III were prepared using a continuous mixer rather than a batch mixer as in Tables I and II. Table III compares the physical properties of elastomeric dynamic vulcanizates cured with 4.5 phr of a conventional phenolic curative (Control H) to those cured with 4.5, 3.6, and 2.7 phr of a phenolic curative having a higher number of dibenzyl ether linkages (Examples 9, 10, and 11). Example 11 shows the vulcanizate with as little as 2.7 phr of the phenolic curative having higher number of dibenzyl ether linkages had a larger ultimate tensile strength than the Control H cured with much larger amounts of a conventional phenolic resin curative. The large ultimate tensile strength of Examples 9, 10, and 11 was indicative of effective crosslinking using the phenolic resin with higher number of dibenzyl ether linkages. The physical properties of Examples 9, 10, and 11 showed differences due to use of a decreased amount of the phenolic resin curative having higher number of dibenzyl ether linkages. The ultimate tensile strength went through a maximum as the phenolic resin was decreased. The 300% modulus showed a gradual decrease with the use of decreasing amounts of phenolic resin. The oil swell values increased as the amount of phenolic resin was decreased indicating lower crosslink density. Table III illustrates that the amount of phenolic resin can be decreased when resin with a higher number of dibenzyl ether linkages is used.

TABLE III

|  | Control H | Example 9 | Example 10 | Example 11 |
|---|---|---|---|---|
| Rubber V3666 | 100 pbw | 100 | 100 | 100 |
| Polypropylene | 45 | 45 | 45 | 45 |
| Oil | 135 | 135 | 135 | 135 |
| Wax | 5 | 5 | 5 | 5 |
| Clay | 42 | 42 | 42 | 42 |
| ZnO | 2 | 2 | 2 | 2 |
| Phenolic Resin | 4.5 | 4.5 | 3.6 | 2.7 |
| SnCl$_2$ | 1.26 | 1.26 | 1.26 | 1.26 |
| Characterization of Phenolic Resin | | | | |
| Ether Bridges per 100 aromatic rings | 40 | 70 | 78 | 70 |
| Equiv. Wt | 233.4 | 159.9 | 159.9 | 159.9 |
| Resin Type | SP1045 | | SMD 9938 | |
| Properties of Thermoplastic Elastomer | | | | |
| Shore A | 61 | 60 | 59 | 58 |
| TS % | 8 | 8 | 9 | 9 |
| UTS, MPa | 6.07 | 6.76 | 7.17 | 6.21 |
| M100, MPa | 3.24 | 2.69 | 2.76 | 2.48 |
| M300, MPa | 4.97 | 5.66 | 5.45 | 4.83 |
| UE % | 350 | 370 | 410 | 410 |
| CS, % (100° C., 22 hr) | 24.8 | 22.8 | 24.4 | 25.4 |
| OS, % (123 ± 2° C., 70 hr) | 78.1 | 79.8 | 82.5 | 93.7 |

Table IV summarizes compositions and physical properties from harder thermoplastic elastomers having more polypropylene and less oil along with either a conventional phenolic resin or a phenolic resin having a higher number of dibenzyl ether linkages. In Table IV the oil swell values for the elastomers are lower for an example elastomer cured with the phenolic resin curative having a higher number of dibenzyl ether linkages than for a control elastomer cured with conventional phenolic resin. This indicates more crosslinks were formed with the phenolic resin having a higher number of dibenzyl ether linkages. Generally Table IV illustrates that for most physical properties the lowest concentration of the phenolic resin having a higher number of dibenzyl ether linkages gave very adequate properties when compared to the thermoplastic elastomer cured with a conventional phenolic resin.

TABLE IV

|  | Control I | Ex 12 | Ex 13 | Ex 14 |
|---|---|---|---|---|
| Rubber V3666 | 100 pbw | 100 | 100 | 100 |
| Polypropylene | 22.3 | 22.3 | 22.3 | 22.3 |
| Oil | 130 | 130 | 130 | 130 |
| Wax | 5 | 5 | 5 | 5 |
| Clay | 42 | 42 | 42 | 42 |
| ZnO | 2 | 2 | 2 | 2 |
| Phenolic Resin | 7.0 | 7.0 | 5.6 | 4.2 |
| SnCl$_2$ | 1.26 | 1.26 | 1.26 | 1.26 |
| Characterization of Phenolic Resin | | | | |
| Ether Bridges per 100 aromatic rings | — | 70 | 70 | 70 |
| Resin Type | SP1045 | | SMD 9938 | |
| Properties of Thermoplastic Elastomer | | | | |
| Shore D | 46 | 48 | 48 | 46 |
| TS % | 44 | 39 | 39 | 42 |
| UTS, MPa | 11.93 | 14.83 | 13.03 | 11.38 |
| M100, MPa | 9.38 | 9.17 | 9.24 | 8.97 |
| M300, MPa | 11.10 | 11.72 | 11.86 | 11.03 |
| UE % | 410 | 430 | 360 | 340 |
| CS, % (100° C., 22 hr) | 64.9 | 58.2 | 64.2 | 64.3 |
| OS, % (123 ± 2° C., 70 hr) | 45.8 | 40.0 | 41.5 | 44.6 |

Table V thermoplastic elastomers were made using recipes as in Tables I and II. Controls K and L were made using the same recipe as Controls E and G using 4.5 phr of conventional phenolic resin curative and Examples 15 and 16 were made using the same recipe as Examples 5 and 6 using 2.0 phr of the phenolic resin with 70 or 71 dibenzyl ether linkages per 100 aromatic rings. The elastomers of Table V were prepared from phenolic resin curatives which were first aged 6 minutes in air at 200° C. This aging was to determine if exposure to high temperature aging 40 (simulating the temperature conditions the resin is exposed to in the commercial mixing process) could detract from the efficiency of the phenolic resin curatives with a higher number of dibenzyl ether linkages as it does with the conventional phenolic resin curative.

A comparison of Examples 15 and 16 where the phenolic resin with higher number of dibenzyl ether linkages was aged 6 min at 200° C. with Examples 5 and 6 where no aging occurred illustrates that the high ether bridge containing phenolic resin was as effective in crosslinking after aging as before. The test values that increase with crosslinking (Shore A, UTS, M100 and M300) increased with aging while the tests that decrease with crosslinking (UE, CS and OS) decreased with aging.

A comparison of Controls K and L which used conventional phenolic resins which were first aged. 6 minutes at 200° C. with Controls E and F of Table II illustrates that conventional phenolic resins lose their effectiveness at crosslinking during aging. The physical properties of the cured dynamic vulcanizate which increase with crosslinking (Shore A, UTS, M100 and M300) consistently were lower in Controls K and L from the heat aged conventional phenolic resin. The physical properties which decrease with crosslinking (UE, CS and OS) were consistently higher in Controls K and L from the heat aged conventional phenolic resins.

This illustrates that the phenolic resins having a high number of dibenzyl ether linkages have a higher retention of their activity to crosslink unsaturated rubber than do conventional phenolic resins.

A comparison of the physical properties from Controls K and L cured with 4.5 phr of conventional resin, to the physical properties of Examples 15 and 16, cured with 4.5 phr of high dibenzyl ether bridge content phenolic resin illustrates how the combined effectiveness of the phenolic resin with a higher number of dibenzyl ether linkages and the retention of activity of these high dibenzyl ether bridge content phenol formaldehyde resin after aging resulted in the Examples having better crosslinking than the Controls (as illustrated by the physical properties of the vulcanizate). Thus 4.5 phr of the phenolic resins with a higher number of dibenzyl ether linkages resulted in more crosslinking than 4.5 phr of conventional phenolic resin.

Figure 2:
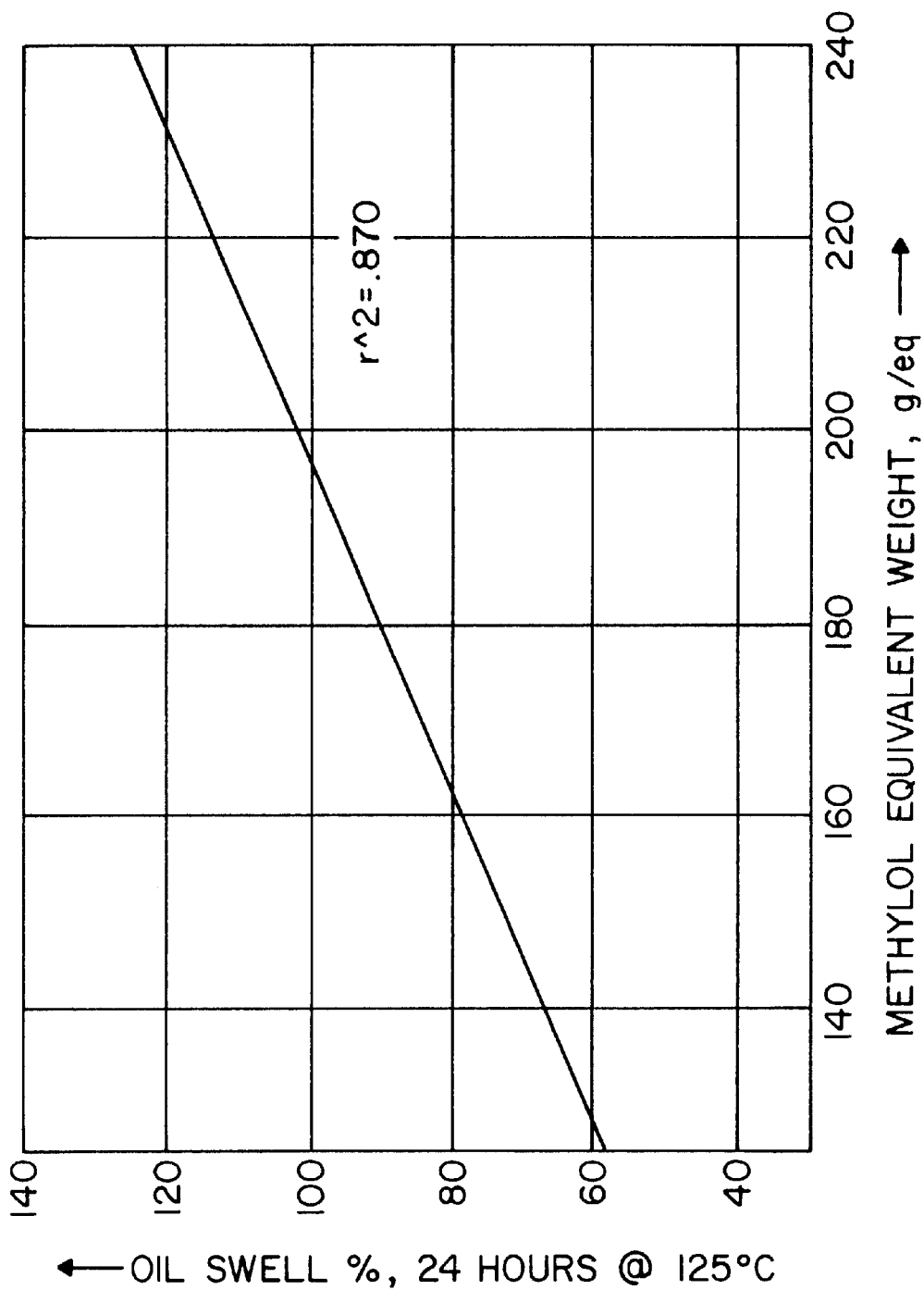
FIG. 2 is a plot of the oil swell ASTM D471 values (50–140 wt. %) of TPVs of Table V made from the phenolic resins of different methylol equivalent weights (120–240 g/eq) after aging at 24 hours at 125° C.

Resins having the preferred range of dibenzyl ether bridge also show improved heat stability over conventional resin as reflected in low weight loss upon heat aging. FIG. 1 shows the weight loss measured after aging at 200° C. for 6 minutes versus the methylol equivalent weight. As can be seen, resins having lower methylol equivalent weight, i.e, higher levels of dibenzyl ether bridge, exhibit lower weight loss during the heat aging test when compared to conventional resole resins. The improved thermal stability of the resin leads to TPV compositions having lower oil swell. The lower oil swell is reflective of a higher crosslink density of the rubber which is strongly desired. The relationship between methylol equivalent weight and oil swell of a TPV cured with a heat aged phenolic resin of specific methylol equivalent weight is shown in FIG. 2 and Table 5.

TABLE V

Physical Properties of Thermoplastic Elastomers Prepared From Phenolic Resin Curatives Aged 6 Minutes at 200° C. in Air

| | Cntrl J | Cntrl K | Cntrl L | Ex 15 | Ex 16 |
|---|---|---|---|---|---|
| EPDM Rubber | 100 phw | 100 | 100 | 100 | 100 |
| Polypropylene | 45 | 45 | 45 | 45 | 45 |
| Oil | 135 | 135 | 135 | 135 | 135 |
| Wax | 5 | 5 | 5 | 5 | 5 |
| Clay | 42 | 42 | 42 | 42 | 42 |
| ZnO | 2 | 2 | 2 | 2 | 2 |
| Phenolic Resin | 4.5 | 4.5 | 4.5 | 4.5 | 4.5 |
| $SnCl_2$ | 1.26 | 1.26 | 1.26 | 1.26 | 1.26 |
| Characterization of Phenolic Resin | | | | | |
| Ether Bridges per 100 aromatic rings | 0.01 | 40 | 46 | 70 | 71 |
| Weight per Methylol Equivalent | 1,700 | 233.4 | 215.6 | 159.9 | 158.5 |
| Resin Type | HRJ10518 | SP1045 | SP1045 | HRJ 122247 | SMD9938 |
| Properties of Thermoplastic Elastomer Cured with the Phenolic Resin | | | | | |
| Shore A | 58 | 60 | 59 | 62 | 61 |
| TS % | 8 | 9 | 10 | 8 | 8 |
| UTS, MPa | 5.24 | 5.24 | 5.80 | 6.48 | 5.86 |
| M100, MPa | 2.00 | 2.21 | 2.21 | 2.90 | 2.62 |
| M300, MPa | 4.21 | 4.48 | 4.83 | 6.41 | 5.86 |
| UE % | 420 | 380 | 390 | 300 | 300 |
| CS, % (100° C., 22 hr) | 23.2 | 30.4 | 34.4 | 17.0 | 20.9 |
| OS, % (123± 2° C., 70 hr) | 134 | 120.4 | 118.4 | 80.0 | 72.9 |

To determine the effect of dibenzyl ether bridge level on curing rates and crosslinking efficiency of two different phenolic resin curatives was studied by incorporating them into thermoset EPDM compositions. The recipe was 100 parts by weight of EPDM rubber, either 3 or 4.5 parts by weight of phenolic resin, 2 parts by weight ZnO and optionally 1.26 parts by weight $SnCl_2$. Table VI below illustrates how the time to 1 dNm torque rise and maximum torque are effected by the type and amount of phenolic resin and the presence of an activator $SnCl_2$. The time to 1 dNm torque rise is indicative of the initial rate of cure less scorch delay. The maximum torque is related to the efficiency of the curative in reacting with the available double bonds in producing crosslinks.

TABLE VI

Cure Characteristics EPDM with Phenol Resins

| | Without $SnCl_2$ | | With $SnCl_2$ | | Ether |
| Benzyl Ether Bridges | Time to 1 dNm torque rise (min) | Max. Torque dNm | Time to 1 dNm Torque Rise (min) | Max. Torque dNm | bridges per 100 aromatic rings |
|---|---|---|---|---|---|
| HRJ 10518 3 PHR | 3.66 | 2.65 | 0.61 | 3.33 | 1 |
| SMD 9938 3 phr | 2.19 | 3.68 | 0.53 | 4.69 | 71 |
| HRJ 10518 4.5 phr | — | — | 0.53 | 3.68 | 1 |
| SMD 9938 4.5 phr | — | — | 0.51 | 4.56 | 71 |

The results in Table VI are quite contrary to generally accepted theories on the effect of methylene versus dibenzyl ether bridges on cure rates. For conventional thermoset rubbers the resole type phenol formaldehyde manufacturers recommend resins such as HRJ 10518 having about 1 dibenzyl ether bridges per 100 aromatic rings as being an optimal resin. Other sources such as the article on resol-type resin cures cited in the background of the application and being in the Journal Applied Polymer Science, Applied Polymer Symposium 51, 277–291 (1992) teach that high methylene bridge content provides faster cure times. Table VI is the first data presented which shows a faster cure rate in a thermoset rubber compound when using a resole type phenol formaldehyde with a high dibenzyl ether bridge content.

While in accordance with the patent statutes, the best mode and preferred embodiment has been set forth, the scope of the invention is not limited thereto, but rather by the scope of the attached claims.

What is claimed is:

1. A thermoplastic vulcanizate comprising;
   a) from about 15 to about 75 parts by weight of a crystalline polyolefin resin and
   b) from about 25 to about 85 parts by weight of an unsaturated rubber, said parts by weight being based upon 100 parts by weight total of said crystalline polyolefin and said unsaturated rubber
   wherein said vulcanizate comprises crosslinks in said unsaturated rubber derived from curing with from about 0.5 to about 20 phr of a phenolic resin curative having from about 50 to about 99 dibenzyl ether bridges per 100 aromatic rings, and wherein said phr is parts by weight per 100 parts by weight unsaturated rubber.

2. A vulcanizate according to claim 1, wherein said unsaturated rubber comprises repeat units in amounts from about 90 to about 99.6 wt. % from polymerizing at least two alpha monoolefins monomers of the formula $CH_2$=CHR where R is H or an alkyl of from 1 to 12 carbon atoms and from about 0.4 to about 10 wt. % repeat units from polymerizing at least one nonconjugated polyunsaturated monomer having from 5 to 20 carbon atoms and wherein said resin curative had from about 55 to about 80 dibenzyl ether bridges per 100 aromatic rings.

3. A thermoplastic vulcanizate according to claim 2, wherein said phenolic resin curative had from about 60 to about 80 dibenzyl ether bridges per 100 aromatic rings.

4. A thermoplastic vulcanizate according to claim 1, wherein said unsaturated rubber comprises
   a polymer having from about 90 to about 99.5 weight percent repeat units from isobutylene and from about 0.5 to about 10 wt. % repeat units from a polyunsaturated monomer having from 4 to 12 carbon atoms, said polymer optionally being halogenated and wherein said resin curative has from about 55 to about 80 dibenzyl ether bridges per 100 aromatic rings.

5. A thermoplastic vulcanizate according to claim 4, wherein said phenolic resin had from about 60 to about 80 dibenzyl ether bridges per 100 aromatic rings.

6. A thermoplastic vulcanizate according to claim 1, wherein said crystalline polyolefin is polyethylene or polypropylene.

7. A thermoplastic vulcanizate according to claim 6, wherein the amount of said phenolic resin is from about 0.5 to about 14 parts by weight based upon 100 parts by weight unsaturated rubber and the phenolic resin has from about 60 to about 90 dibenzyl ether linkages per 100 aromatic rings.

8. A thermoplastic vulcanizate according to claim 7, wherein said phenolic resin has from about 60 to about 80 dibenzyl ether linkages per 100 aromatic rings of said phenolic resin curative.

9. A thermoplastic vulcanizate according to claim 8, wherein said unsaturated rubber comprises a polymer having from about 90 to about 99.6 wt. % repeat units from polymerizing at least two alpha monoolefins monomers of the formula $CH_2$=CHR or $CH_2$=C(CH_3)R where R is H or an alkyl of from 1 to 12 carbon atoms and from about 0.4 to about 10 wt. % repeat units from copolymerizing at least one nonconjugated polyunsaturated monomer having from 5 to 20 carbon atoms, wherein said weight percents are based upon the weight of said polymer, and wherein said polymer having from about 90 to about 99.6 wt. % repeat units from polymerizing at least two monoolefins rubber is present from about 25 to about 85 parts by weight.

10. A thermoplastic vulcanizate according to claim 8, wherein said unsaturated rubber comprises a polymer having from about 90 to about 99.5 weight percent repeat units from isobutylene and from about 0.5 to about 10 wt. % repeat units from a polyunsaturated monomer having from 4 to 12 carbon atoms, said polymer optionally being halogenated and said polymer having from about 90 to about 99.5 weight percent repeat units from isobutylene being present from about 25 to about 85 parts by weight.

11. A thermoplastic vulcanizate according to claim 1, wherein said unsaturated rubber comprises natural rubber or at least one synthetic rubber having at least 50 wt. % of its repeat units from one or more conjugated diene monomers having from 4 to 8 carbon atoms, or combinations of natural rubber and said at least one synthetic rubber.

12. A thermoplastic vulcanizate according to claim 11, wherein said phenolic resin had from about 60 to about 80 dibenzyl ether bridges per 100 aromatic rings.

13. A thermoplastic vulcanizate according to claim 8, wherein the majority of the repeat units of said phenolic resin have an octyl substituent.

14. A vulcanizate according to claim 1, wherein said phenolic resin has a methylol equivalent weight from about 125 to about 185.

15. A vulcanizate according to claim 1, wherein said phenolic resin has a methylol equivalent weight of from about 145 to about 200 and has a majority of the repeat units with an octyl substituent thereon.

16. A vulcanizate according to claim 1, wherein said methylol equivalent weight is from about 175 to about 245 and a majority of the repeat units of said phenolic resin curative have dodecyl substituent thereon.

17. A vulcanizate according to claim 1, wherein said methylol equivalent weight is from about 120 to about 150 and a majority of the repeat units of said phenolic resin curative have a butyl substituent thereon.

18. A process for dynamically vulcanizing a rubber of a thermoplastic elastomer mixture, said thermoplastic elastomer mixture including a crystalline polyolefin, an unsaturated rubber and a phenolic resin curative, said process comprising the steps of a) blending said unsaturated rubber with said crystalline polyolefin in a melted form forming a mixture, and b) crosslinking said unsaturated rubber with said phenolic resin curative during said blending;

wherein said phenolic resin curative prior to curing comprises from about 50 to about 99 dibenzyl ether bridges per 100 aromatic rings of said phenolic resin curative.

19. A process according to claim 18, further comprising adding an activator for said phenolic resin curative.

20. A process according to claim 19, wherein said unsaturated rubber is present in an amount from about 25 to about 85 parts by weight per 100 total parts by weight of said thermoplastic polyolefin and an unsaturated rubber wherein said unsaturated rubber comprises from about 90 to about 99.6 wt. % repeat units derived from polymerizing at least two alpha monoolefin monomers of the formula $CH_2$=CHR where R is H or an alkyl of from 1 to 12 carbon atoms and from about 0.4 to about 10 wt. % repeat units from copolymerizing at least one polyunsaturated monomer having from 5 to 20 carbon atoms.

21. A process according to claim 20, wherein said phenolic resin has from about 60 to about 85 dibenzyl ether bridges per 100 aromatic rings.

22. A process according to claim 19, wherein said unsaturated rubber comprises a polymer having from about 90 to about 99.5 weight percent repeat units from isobutylene and from about 0.5 to about 10 wt. % repeat units from a polyunsaturated monomer having from 4 to 12 carbon atoms, and said polymer optionally being halogenated.

23. A process according to claim 22, wherein said phenolic resin has from about 60 to about 85 dibenzyl ether bridges per 100 aromatic rings.

24. A process according to claim 18, wherein said unsaturated rubber comprised natural rubber or at least one synthetic rubber having at least 50 wt. % of its repeat units from one or more conjugated diene monomers having from 4 to 8 carbon atoms, or combinations of natural rubber and said at least one synthetic rubber.

25. A process according to claim 24, wherein said phenolic resin curative has from about 60 to about 80 dibenzyl ether bridges per 100 aromatic rings of said phenolic resin curative.

* * * * *